(12) United States Patent
Nakao et al.

(10) Patent No.: US 6,272,097 B1
(45) Date of Patent: Aug. 7, 2001

(54) OPTICAL HEAD AND APPARATUS FOR RECORDING AND REPRODUCING OPTICAL INFORMATION THROUGH THE USE OF THE OPTICAL HEAD

(75) Inventors: Takeshi Nakao, Sagamihara; Shigeru Nakamura, Tachikawa; Toshiaki Tanaka, Kodaira; Takeshi Shimano, Tokorozawa, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/313,211

(22) Filed: May 18, 1999

(30) Foreign Application Priority Data

May 19, 1998 (JP) .................................................. 10-136766

(51) Int. Cl.$^7$ ........................................................ G11B 7/25
(52) U.S. Cl. ................................. 369/112.08; 369/112.09; 369/112.2; 369/120; 369/122
(58) Field of Search .......................... 369/44.12, 44.23, 369/112.02, 112.05, 112.08, 112.09, 112.13, 112.14, 112.2, 112.21, 112.23, 112.25, 112.27, 120–122

(56) References Cited

U.S. PATENT DOCUMENTS

| | | |
|---|---|---|
| 4,993,035 | * 2/1991 | Laikhtman . |
| 5,481,386 | * 1/1996 | Shimano et al. . |
| 5,715,226 | * 2/1998 | Shimano et al. . |
| 5,783,844 | * 7/1998 | Kobayashi et al. . |
| 5,995,474 | * 11/1999 | Shimano et al. . |

FOREIGN PATENT DOCUMENTS

| | | |
|---|---|---|
| 62-58432 | 3/1987 | (JP) . |
| 64-46242 | 2/1989 | (JP) . |
| 4-255923 | 9/1992 | (JP) . |
| 6-251410 | 9/1994 | (JP) . |

| | | |
|---|---|---|
| WO96/27880 | 4/1998 | (WO) . |

OTHER PUBLICATIONS

Japanese Journal of Applied Physics, vol. 36, 1997, pp. 589–590.
The 15th Annual Conference on Magnetics in Japan, Paper 31pB–5 (Technical Digest), p. 310, 1991.
Proceedings of "Optical Memory Symposium '88", pp. 35–36.
IEICE Technical Study Report of Electronics, Information and Communication Engineers of Japan, 1991, Report No. MR 91–72–79, Feb. 27, 1992.

* cited by examiner

*Primary Examiner*—W. R. Young
(74) *Attorney, Agent, or Firm*—Mattingly, Stanger & Malur, P.C.

(57) ABSTRACT

A minute optical head is provided so that a light source and one or more photo detector elements are integrated on the same substrate by a simple manufacturing process and may be applied to an apparatus for recording and reproducing recordable optical information. An apparatus for recording and reproducing optical information is arranged to have a minute optical head. A light waveguide layer composed of column semiconductor crystal is formed on a monocrystalline transparent substrate and an active layer is formed on the side of the light waveguide layer. The light beam source is a semiconductor having a vertical resonator formed of a high-reflection film before and after an emitting surface of the active layer so that a light beam is vertically radiated to the substrate. The photo detector element is integrated on the closer portion of the substrate to the light beam source of the semiconductor laser. Further, on the opposed surface of the substrate to the light beam source are sequentially integrated a first transparent layer, a diffraction grating, a second transparent layer, a phase difference generating element, a third transparent layer, a light beam focusing element, a fourth transparent layer, and a slide-resisting protective layer. The slide-resisting protective layer is located closer to and as opposed to the information recording medium.

25 Claims, 11 Drawing Sheets

IN FOCUS    JUST FOCUS    OUT FOCUS

OPTICAL HEAD AND APPARATUS FOR RECORDING AND REPRODUCING OPTICAL INFORMATION THROUGH THE USE OF THE OPTICAL HEAD

BACKGROUND OF THE INVENTION

The present invention relates to an optical head and an apparatus for recording and reproducing optical information through the use of the optical head.

As a system of reducing an optical head mounted in an apparatus for recording and reproducing optical information on and from an optical medium like an optical disk, several prior arts have been made public as disclosed in JP-A-62-58432, JP-A-64-46242, JP-A-4-255923, and JP-A-6-251410. The optical head disclosed in the publication of JP-A-62-58432 is arranged so that photo detector elements and a semiconductor laser having a Fabri-Perot horizontal resonator as a light source are integrated on the same substrate. On the other hand, the optical head disclosed in JP-A-64-46242, JP-A-4-255923, or JP-A-6-251410 employs the so-called surface emitting laser as its light source.

For the optical head disclosed in JP-A-62-58432, in order to apply the optical head to the apparatus for recording and reproducing optical information such as an optical disk drive, it is necessary to curve an optical axis of a light flux fired from a semiconductor laser by 90 degrees. The publication of JP-A-62-58432 has disclosed a method of forming a reflective mirror through the use of an etching technique, for example. However, this method burdens the manufacturing process with great difficulty. Further, since the semiconductor laser needs a different density of impurities to be implanted from the photo detector elements, if both of the semiconductor laser and the photo detector elements are formed by the same process, disadvantageously, it is difficult to obtain the sufficient characteristics of both.

If the surface emitting laser is used as a light source like the optical head disclosed in JP-A-64-46242, JP-A-4-255923, or JP-A-6-251410, no reflective mirror is required to be formed unlike the optical head disclosed in JP-A-62-58432. Hence, the use of the surface emitting laser as the light source makes the manufacturing process a bit simpler. However, at this time, the difficulty of the surface emitting laser in enhancing an output power and fixing a direction of polarization of outgoing light makes it difficult to apply such an optical laser to apply to an apparatus for recording and reproducing recordable optical information.

SUMMARY OF THE INVENTION

It is an object of the present invention to provide an optical head which includes a light source and photo detector elements integrated on the same substrate by a simple manufacturing process and may be applied to an apparatus for recording and reproducing recordable optical information, and an apparatus for recording and reproducing optical information through the use of the optical head.

According to the present invention, a light source is a semiconductor laser element having a vertical resonator composed by forming a light waveguide layer of column semiconductor crystal on a monocrystalline transparent substrate through the use of a selective growth technique, forming an active layer on each side of the light waveguide layer, and then forming a Bragg reflector formed of a super lattice structure high-reflection film before and after an emitting surface of the active layer so that light outgoes perpendicularly to the monocrystalline substrate. By devising the pattern of the insulating layer mask used in the selective growth technique, the photo detector element may be formed on the substrate on which the semiconductor laser beam source is formed and closer to the light source.

In the optical head according to the present invention, a light beam separating element is formed by laminating a first transparent layer on the opposed plane of the monocrystalline transparent substrate to the semiconductor laser element by means of the plasma CVD technique or the sputtering technique and forming a diffraction grating on the lower surface of the first transparent layer through the effect of a photomask exposure process and an ion exchange process. Next, a second transparent layer is laminated on the lower surface of the first transparent layer by means of the plasma CVD technique or the sputtering technique and an element of generating a phase difference corresponding to a quarter-wave plate is formed on the lower surface of the second transparent layer. In succession, a third transparent layer is laminated under the second transparent layer by means of the plasma CVD technique or the sputtering technique. Then, a light condensing element is composed by forming on the lower surface of the third transparent layer a grating lens by means of a photomask exposure process, or a index-distributed type lens or a convex lens by means of an ion exchange process or the like. Moreover, a fourth transparent layer is laminated on the lower surface of the third transparent layer by means of the plasma CVD technique or the sputtering technique. On the lower surface of the fourth transparent layer is formed a slide-resisting protective layer such as a ceramic material by means of the sputtering technique. Next, the fourth transparent layer and the slide-resisting protective layer are located close to each other as opposed to an information recording medium.

The light applied from the semiconductor laser beam source passes through the first transparent layer, the light beam separating element, the second transparent layer, the element of generating a phase difference, and the third transparent layer. Then, through the use of the light focusing element used in the fourth transparent layer, a focused spot is formed closer to the plane opposed to the information recording medium. The light reflected on the information recording medium passes through the fourth transparent layer, the light focusing element, the third transparent layer, the element of generating a phase difference, and the second transparent layer. The light passed through the second transparent layer is separated into plural fluxes of light through the effect of the light beam separating element and then the separated fluxes of light are guided to the photo detector element integrated and formed closer to the semiconductor laser beam source.

According to the present invention, like the semiconductor laser having a Fabri-Perot horizontal resonator, the semiconductor laser used as a light source has a structure of applying a flux of light from an end of the active layer. It is more advantageous in a viewpoint of enhancing an output power and controlling a direction of light of polarization than the so-called surface emitting laser. Hence, the resulting optical head may be applied to the apparatus for recording and reproducing recordable optical information. The use of the semiconductor manufacturing process such as a photomask exposure process makes it possible to form the light source, the photo detector element and the function elements except them through the use of one process, thereby reducing the size and the cost of the resulting optical head.

DETAILED DESCRIPTION OF THE EMBODIMENTS

Hereafter, the present invention will be described along the embodiments in detail with reference to the appended drawings.

First Embodiment

Figure 1:
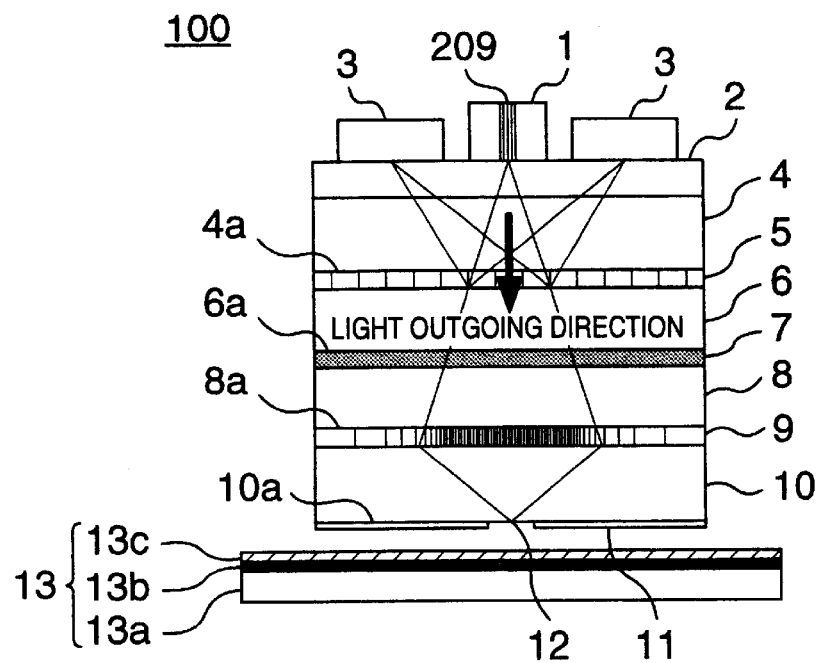
FIG. 1 is a sectional view showing a composition of an optical head according to a first embodiment of the present invention.

FIG. 1 is a sectional view showing a composition of an optical head 100 according to a first embodiment of the present invention. In the optical head 100, a semiconductor laser beam source 1 is located on a monocrystalline transparent substrate 2 made of sapphire (a-$Al_2O_3$) or silicon carbide (a-SiC), for example. The semiconductor laser beam source 1 has an active layer 209 formed perpendicularly to the transparent substrate 2. On the transparent substrate 2, photo detector elements 3 are integrated closer to the semiconductor beam source 1. The concrete composition of the semiconductor laser beam source 1 and the photo detector element 3 will be described below.

On the transparent substrate, a first transparent layer 4 is laminated on the plane opposed to the semiconductor laser beam source 1 by means of the plasma CVD technique or the sputtering technique. On the lower surface 4a of the first transparent layer 4 is formed a diffraction grating 5 by a photomask exposure process and an ion exchange process, for example. The diffraction grating 5 is served as a light beam separating element. Under the first transparent layer 4 is laminated a second transparent layer 6 by means of the plasma CVD technique or the sputtering technique. On the lower surface 6a of the second transparent layer is formed a phase difference generating element 7. This element 7 is served as a quarter-wave plate. The optical axis of the phase difference generating element 7 is set 45 degrees against an active layer 209 of the semiconductor laser beam source 1. Under the second transparent layer 6 is laminated a third transparent layer 8 by means of the plasma CVD technique or the sputtering technique. On the lower surface 8a of the third transparent layer 8 is formed a grating lens 9 by means of a photomask exposure process or the like. The grating lens 9 is served as a light focusing element. Under the third transparent layer 8 is laminated a fourth transparent layer 10 by means of the plasma CVD technique or the sputtering technique. On the lower surface 10a of the fourth transparent layer 10 is formed a slide-resisting protective layer 11 made of ceramics by means of the sputtering technique or the like. The fourth transparent layer 10 and the slide-resisting protective layer 11 are located close to and as opposed to an information recording medium 13.

The laser beam fired by the semiconductor laser beam source 1 passes through the transparent substrate 2, the first transparent layer 4, the diffraction grating 5, the second transparent layer 6, the phase difference generating element 7, and the third transparent layer 8. Then, the laser beam passed through the grating lens 9 is made to be a focused spot near the lower surface 10a of the fourth transparent layer 10 as opposed to the information recording medium 13. The optical axis of the phase difference generating element 7 is set 45 degrees against the active layer 209 of the semiconductor laser source 1. Hence, the beam passed through the phase difference generating element 7 is focused as a substantially circular light spot onto the information recording medium 13.

The information recording medium 13 is composed of a substrate 13a, an information recording film 13b and a protective film 13c. The interval between the focused spot 12 and the information recording medium 13 is set as 1 $\mu$m or lower. Assuming that an index of refraction of the fourth transparent layer 10 is n and a numerical aperture of the grating lens 9 is NA, the effective numerical aperture from the grating lens 9 to the focused spot 12 is n×NA. The grating lens 9 with NA=0.6 may be designed. If the material of the fourth transparent layer 10 is selected to have an index of refraction of n=1.7 or some, the effective numerical aperture may be set as 1 or more. This size of the numerical aperture allows a quite minute spot 12 to be formed.

The light reflected on the information recording medium 13 is passed through the fourth transparent layer 10, the grating lens 9, the third transparent layer 8, the phase difference generating element 7, and the second transparent layer 6. In the passage, the outgoing light of the phase difference generating element 7 is passed through the element 7 again. Hence, the direction of polarization is rotated 90 degrees against the beam fired by the semiconductor laser beam source 1. The beam passed through the second transparent layer 6 is diffracted by the diffraction grating 5 and then is guided to the photo detector elements 3 integrated closer to the semiconductor laser beam source 1.

The diffraction grating 5 is a polarizing one composed of polymeric crystal as disclosed in Japanese Journal of Applied Physics, Vol.36 (1997) pp.589 to 590. It does not serve as the diffraction grating against the light incident from the semiconductor laser beam source 1. Instead, it is only served as the diffraction grating against the light whose direction of polarization is rotated 90 degrees by passing the beam through the phase difference generating element 7 and then the beam reflected on the information recording medium 13 through the element 7, that is, twice passage of the light through the element 7. This kind of composition allows the return light to the semiconductor laser beam source 1 to be lessened, thereby being able to suppress the laser noise generated by the influence of the return light.

The foregoing description has been oriented to the lamination of those transparent layers through the effect of the plasma CVD technique or the sputtering technique. In place, these transparent layers are created respectively and then those transparent layers are pasted with each other. Concretely, the first transparent layer 4 having the diffraction grating 5 formed thereon, the second transparent layer 6 having the phase difference generating element 7 formed thereon, the third transparent layer 8 having the grating lens 9 formed thereon, and the fourth transparent layer 10 having the slide-resisting protective layer 11 formed thereon are created respectively and then those transparent layers are laminated on the transparent substrate 2 made of sapphire or the like and then bonded with each other. The phase difference generating element 7 may be produced by means of various conventional techniques such as growth of anisotrophic optical crystal like niobic acid lithium as controlling the crystalline axis or use of a monoplate or pasted crystalline plates as with the case of creating the normal quarter-wave plate.

Figure 2:
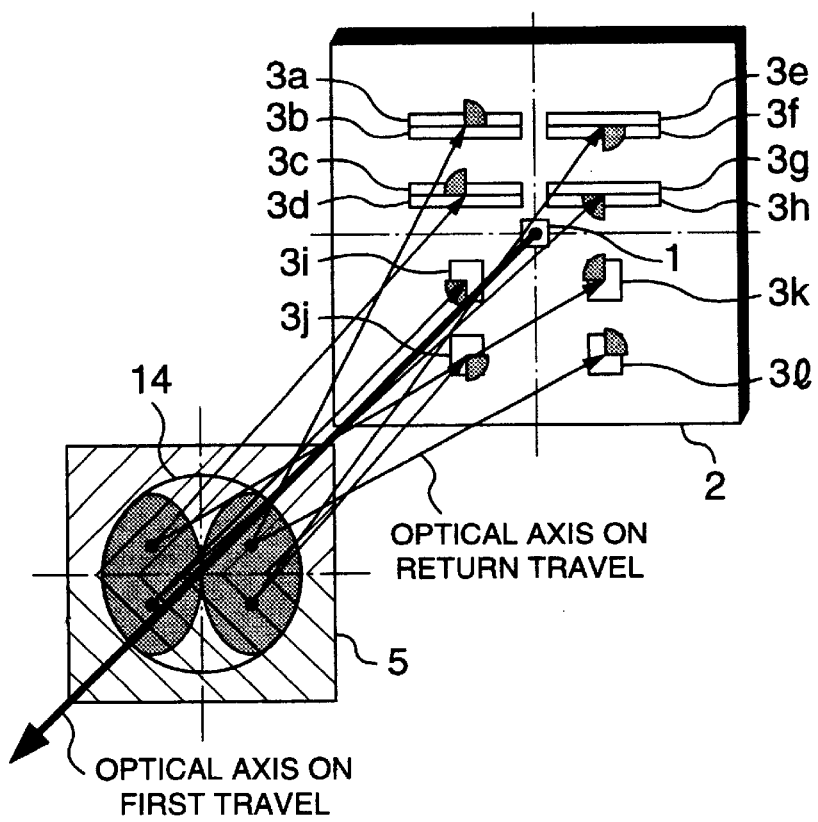
FIG. 2 is a conceptual view showing a diffraction grating and photo detector elements according to the present invention.

FIG. 2 is a conceptual view showing the diffraction grating 5 and the photo detector element 3. The diffraction grating 5 is composed of four grating areas whose pitches and angles are different from each other. As mentioned above, the light reflected on the information recording medium 13 is passed through the phase difference generating element 7 corresponding to the quarter-wave plate twice. Hence, the polarizing direction of the linear polarized light on the return travel is perpendicular to the polarizing direction thereof on the first travel. The diffraction grating 5 is served as a grating against the linear polarized light on the return travel and to divide the polarized light into eight fluxes of light (because of generating +1 degree and −1 degree diffracted light for each of the four areas). Further, in the case of using the information recording medium 13 with ditches, the diffraction grating 5 is located so that the light diffracted from the ditches makes the light intensity distribution appearing on the pupil of the grating lens 9 the state shown on a light flux intensity pattern 14 of FIG. 2. The photo detector element 3 is composed of twelve light-receptacle areas 3a to 3l with which a light dot control signal such as a focus error or a track error or an information signal recorded on the information recording medium 13 is detected or reproduced.

Figure 3A:
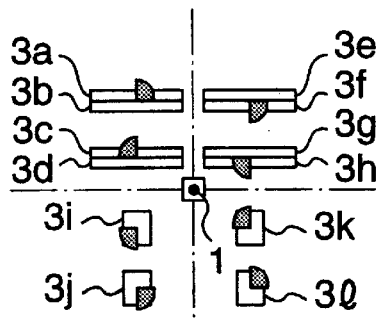
FIGS. 3A to 3C are explanatory views showing distribution of light intensity of a light-receptacle area of the photo detector element and a method for detecting various signals according to the present invention.
Figure 3B:
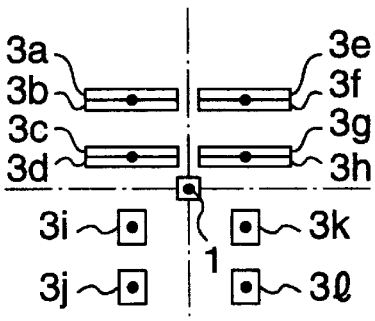
Figure 3C:
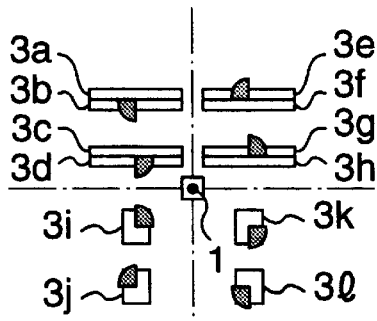

FIGS. 3A and 3B are explanatory views showing a method for operating an output of the photo detector for detecting a light flux pattern and various signals of each light-receptacle areas 3a to 3l if a focus error takes place. As will be discussed below, in a case that the optical head 100 of this embodiment is mounted on a flying slider so that the optical head 100 may slide on the information recording medium 13 in a floating manner, the focus error signal belonging to the light spot control signal is not inevitably required as a signal for driving the overall optical head 100. However, it may be used as a compensating signal if a focus error takes place as a result of a variation of a floating distance. Further, the composition of the light-receptacle areas composing the photo detector element as described above is merely an example. The composition of the photo detector element 3 is not limited to the above composition for the purpose of detecting the light spot control signal and the recorded information signal.

Herein, the focus error signal AF, the track error signal TR (for a push-pull type), and the information signal (regenerating signal) RF are represented as follows.

$$AF=\{(3a+3c)+(3f+3h)\}-\{(3b+3d)+(3e+3g)\}$$

$$TR=(3i+3k)-(3j+3l)$$

$$RF=3i+3j+3k+3l$$

Figure 4A:
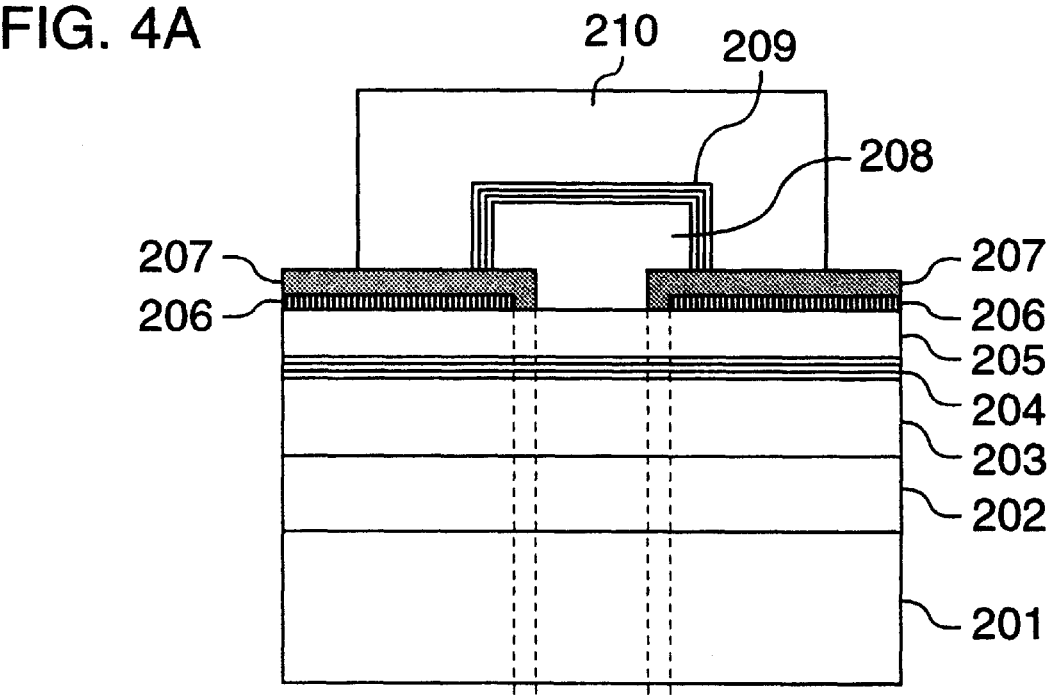
FIGS. 4A and 4B are explanatory views showing a process (first step) for manufacturing a semiconductor laser beam source according to the present invention.
Figure 4B:
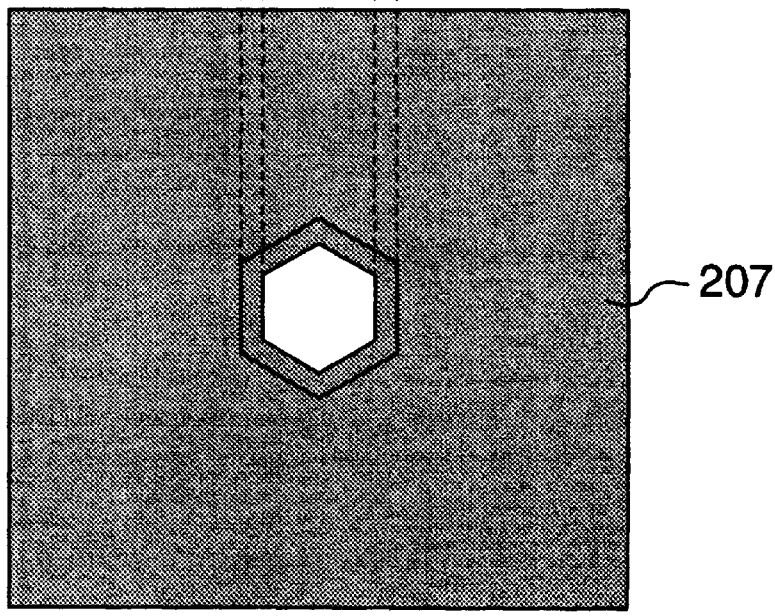

FIGS. 4A to 6B are explanatory views showing a process for manufacturing the semiconductor laser beam source 1. In these figures, FIG. 4A is a sectional view of the manufacturing process and FIG. 4B is a plan view thereof. Later, the manufacturing process shown in these figures and the composition of the semiconductor laser beam source 1 will be described. As shown in FIG. 4A, a GaN buffer layer 202, a GaN light waveguide layer 203, a GaInN/AlGaN super lattice structure high-reflection film 204, and an n-type GaN light waveguide layer 205 are epitaxially grown in sequence on a monocrystalline sapphire substrate 201 by means of the MOCVD (metal-organic chemical vapor deposition) technique. Next, a TiN thin film 206 is evaporated on an n-type GaN light waveguide layer 205. Then, a right hexagonal window areas are etched on the TiN thin film 206 by means of the photolithography process. Then, an insulating film 207 is formed in a manner to cover the TiN thin film 206. Next, the hexagonal window areas as shown in FIG. 4B are formed on the insulating film 207 so that the TiN thin film 206 is not exposed to the air by means of the photolithography and the etching processes. Then, an n-type GaN light waveguide layer 208 and a multi quantum well structure active layer 209 composed of AlGaN/GaN/GaInN are selectively grown. Further, a p-type GaN light waveguide layer 210 is formed so as to comes into contact with the active layer 209.

Figure 5A:
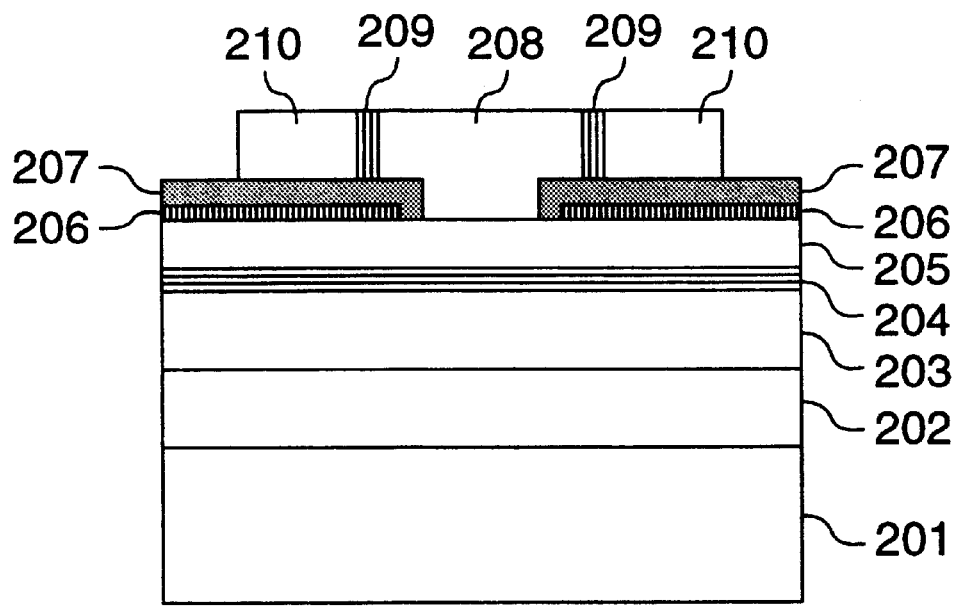
FIGS. 5A and 5B are explanatory views showing a process (second step) for manufacturing a semiconductor laser source according to the present invention.
Figure 5B:
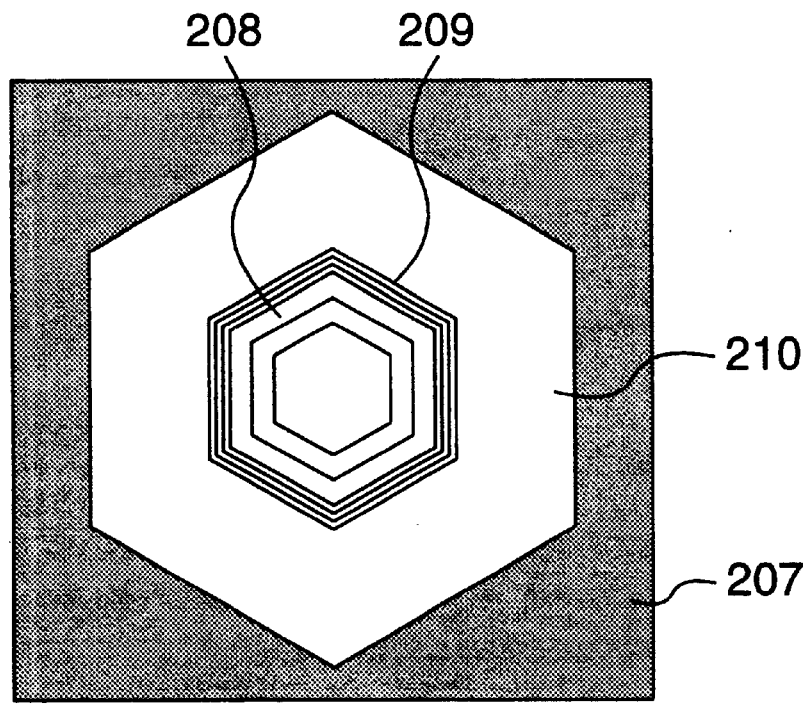

In turn, the description will be oriented to the second step of the manufacturing process. As shown in FIG. 5A, the active layer 209 formed on the side of the n-type GaN light waveguide layer 208 is left and the upper portion of each layer 208, 209 or 210 is removed by the etching process. As shown in FIG. 5B, on a cubic monocrystalline substrate having hexagonal monocrystal or (111) orientation, the six times symmetry take place. Hence, the selective growth makes it possible to grow the hexagonal semiconductor crystal. The provision of the active layer 209 on the side with the semiconductor crystal as the light waveguide makes it possible to form the resonator perpendicularly to the substrate 201.

Figure 6A:
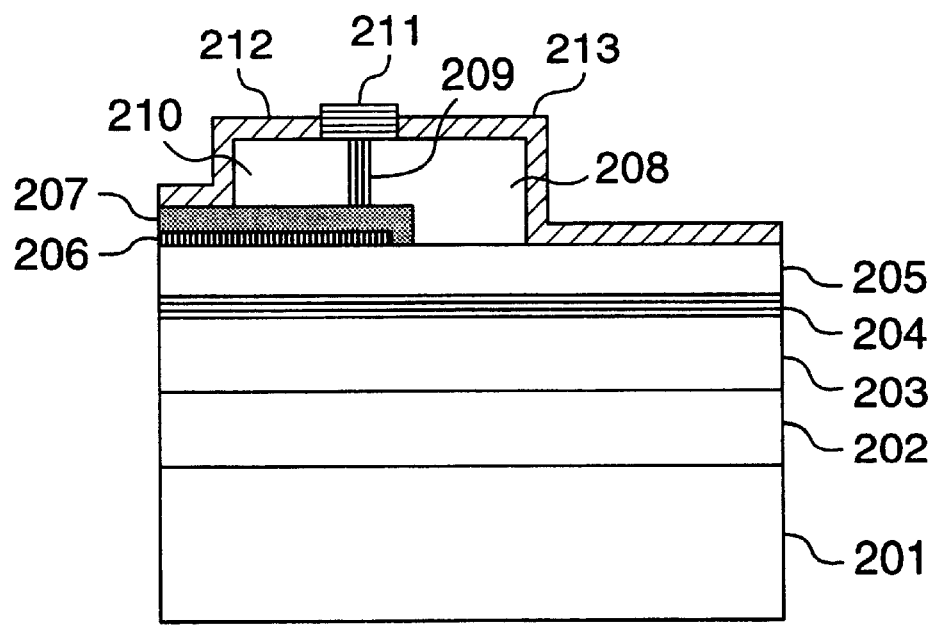
FIGS. 6A and 6B are explanatory views showing a process (third step) for manufacturing a semiconductor laser beam source according to the present invention.
Figure 6B:
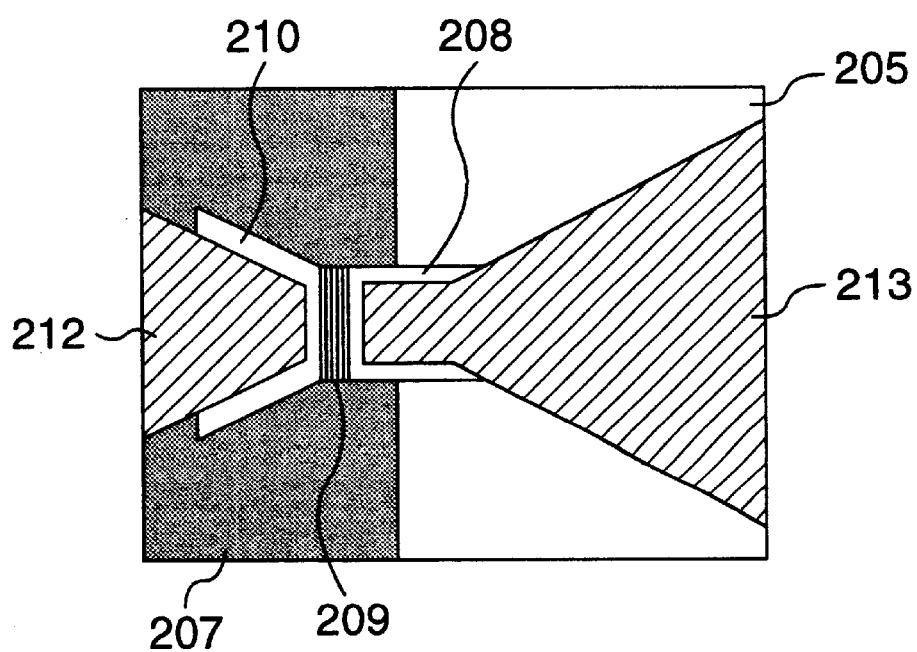

In succession, the description will be oriented to the third step of the manufacturing process. As shown in FIG. 6B, only one side of the hexagonal semiconductor crystal is left and the other sides are etched out by the photolithography process. Then, as shown in FIG. 6A, a dielectric high-reflection film 211 is formed on the active layer 209 and a p-side electrode 212 and an n-side electrode 213 are evaporated. The foregoing process is executed to obtain the foregoing semiconductor laser beam source 1. In addition, the foregoing structure does not necessarily need the TiN thin film 206. In place, it is possible to realize the element having a resonator composed of the GaInN/AlGaN super lattice structure high-reflection film 204 and the dielectric high-reflection film 211.

Figure 7:
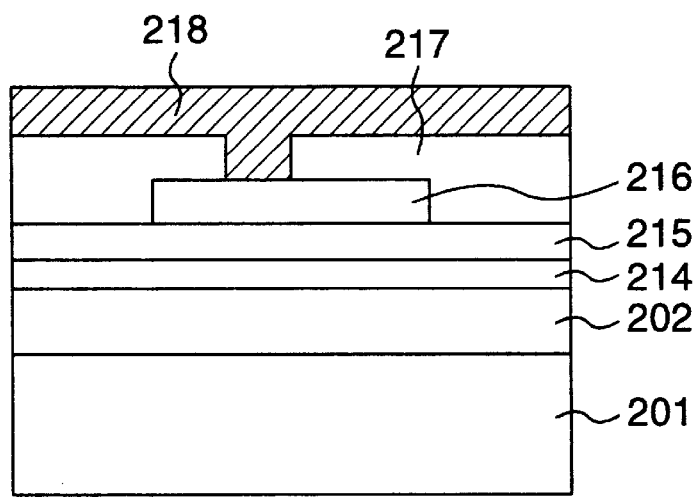
FIG. 7 is a sectional view showing a process for manufacturing the photo detector element according to the present invention.

FIG. 7 is a sectional view showing a process for manufacturing a photo detector element 3. As shown in FIG. 7, a GaN buffer layer 202 is formed on the monocrystalline sapphire substrate 201 and then an $n^+$type GaN layer 214 with lot of n-type impurities added thereto is formed on the GaN buffer layer 202. Next, a GaN layer 215 is grown as a light absorbing layer on the $n^+$type GaN layer 214, wherein for example, GaInN is used because the band gap of the light absorbing layer has to be smaller than that of the active layer. Further, a p-type GaN layer 215 is partially grown on the top of the GaN layer 215. Next, an $SiO_2$ insulating layer 217 is formed with the partial mask of the layer 216 and then the mask is removed and an electrode 218 is formed on the $SiO_2$ insulating layer 217.

In the foregoing description, the semiconductor laser beam source 1 and the photo detector element 3 are described individually. However, both of them may be integrated at the same time. In this case, about the photo detector element 3, after etching the upper portion of the n-type GaN light waveguide layer 208 shown in FIG. 4A, the active layer may be formed in parallel to the transparent substrate 2.

Second Embodiment

Figure 8:
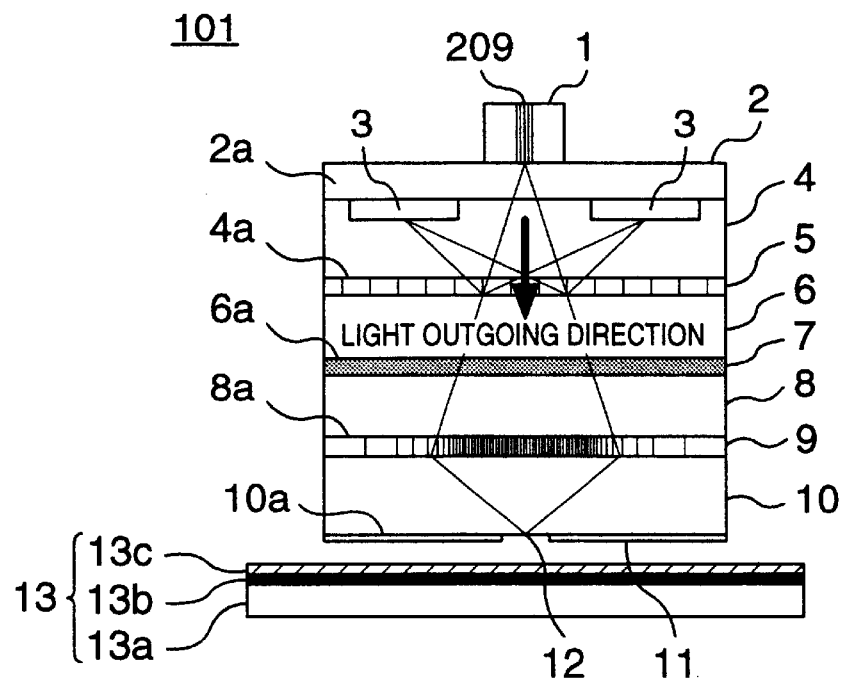
FIG. 8 is a sectional view showing a composition of an optical head according to a second embodiment of the present invention.

FIG. 8 is a sectional view showing a composition of an optical head 101 according to a second embodiment of the present invention. This optical head 101 is arranged so that the photo detector element 3 is formed on an end 2a of the transparent substrate 2, the end 2a opposed to the semiconductor laser beam source 1 as shown in FIG. 8. The other composition of this optical head 101 is basically similar to that of the optical head 100. The use of this composition allows the semiconductor laser beam source 1 and the photo detector element 3 to be produced in the respective processes, thereby enhancing the flexibility of the integrating process of each element. In place, as the photo detector element 3, the element produced in a different process from the manufacturing process of the optical head 101 may be located and bonded on the transparent substrate 2.

Third Embodiment

Figure 9:
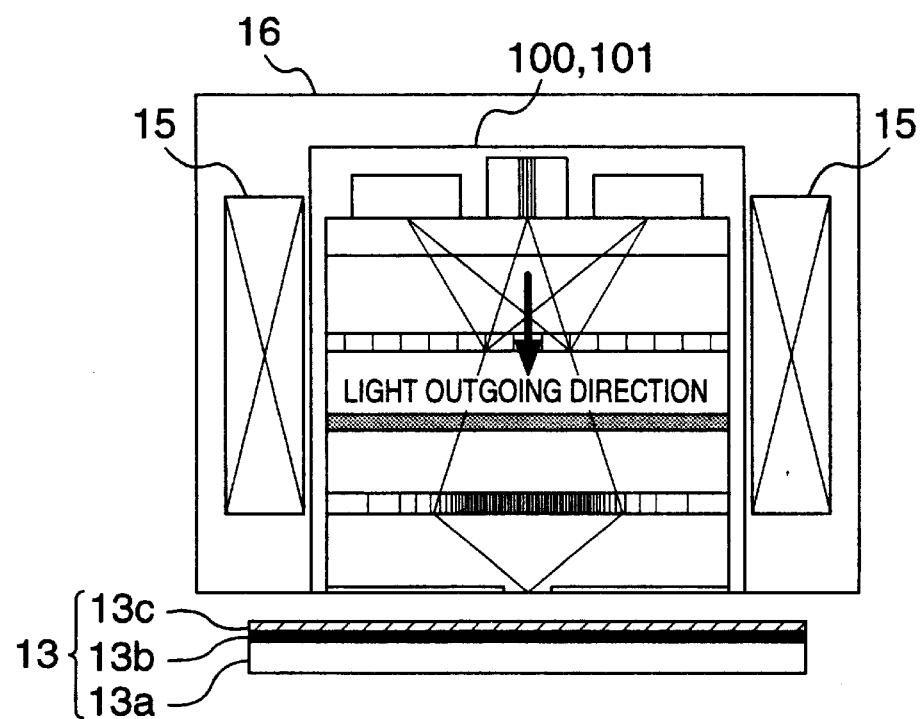
FIG. 9 is a sectional view showing a composition of an optical head according to a third embodiment of the present invention.

FIG. 9 is a sectional view showing a composition of an optical head according to a third embodiment of the present invention. In this composition, a coil 15 is located around the optical head 100 or 101 of the first or the second embodiment for composing an actuator 16, (in which the composition shown in FIG. 9 employs the optical head 100). The driving direction of the actuator 16 may be any one of the so-called focus direction (the vertical direction of the information recording medium 13) and the so-called tracking direction (the direction following eccentric movement of the information recording tracks formed on the information recording medium 13) or both of those directions.

Fourth Embodiment

Figure 10A:
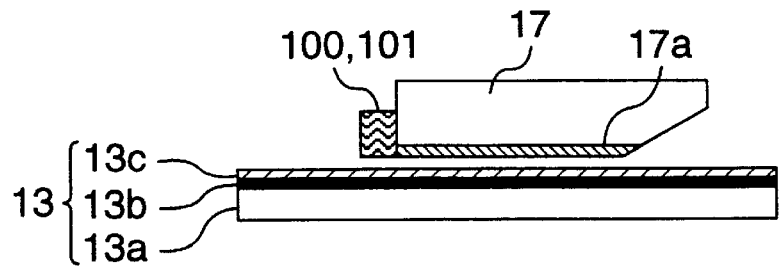
FIGS. 10A and 10B are sectional views showing a composition of an optical head according to a fourth embodiment of the present invention.
Figure 10B:
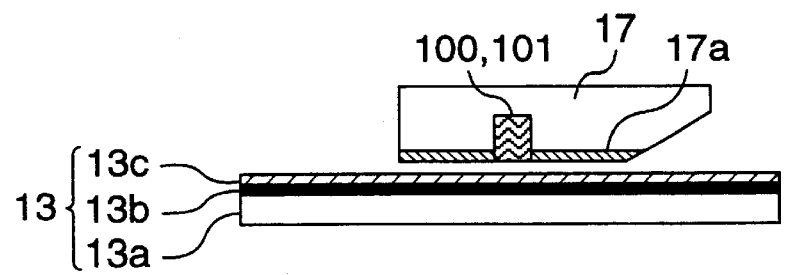

FIGS. 10A and 10B are sectional views showing a composition of an optical head according to a fourth embodiment of the present invention. The optical head 100 or 101 of the first or the second embodiment is mounted on a flying slider 17. FIG. 10A shows the composition in which the optical head 100 or 101 is mounted on the end of the flying slider 17, while FIG. 10B shows the composition in which the optical head 100 or 101 is mounted on the bottom of the flying slider 17. The flying slider 17 is made of ceramics such as zirconium oxide or calcium titanate or a material having a high thermal conductivity such as sapphire for copping with the heat developed by the semiconductor laser beam source 1. The slider 17 may be formed of another material and the ceramics may be used for forming a slide-resisting protective film 17a on the plane opposed to the information recording medium 13.

Fifth Embodiment

Figure 11A:
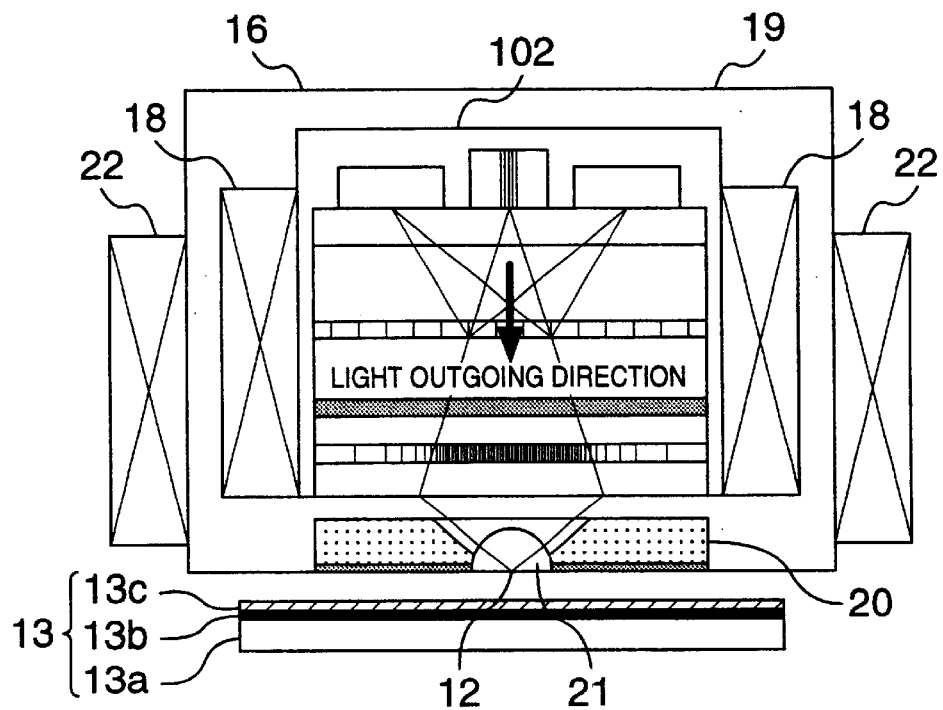
FIGS. 11A and 11B are sectional views showing a composition of an optical head according to a fifth embodiment of the present invention.
Figure 11B:
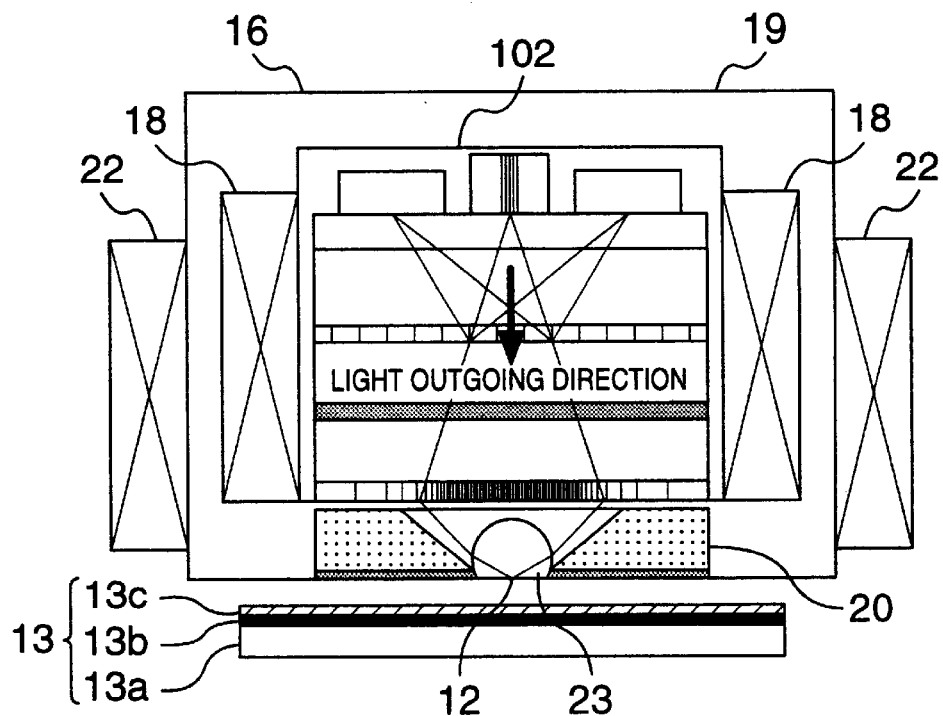

FIGS. 11A and 11B are sectional views showing a composition of an optical head according to a fifth embodiment of the present invention. This embodiment concerns with the composition of the optical head 100 or 101 of the first or the second embodiment so that the element 102 has a lamination up to the third transparent layer 8 with the grating lens 9 formed therein. The coil 18 is located around the element 102 for composing the actuator 19 for driving the overall element 102 in the focusing direction. In FIG. 11A, a semispheric lens 21 is mounted on another member 20 rather than the element 102. The beam applied from the grating lens 9 enters into the semispheric lens 21 so that the beam is focused as a spot 12 around the opposed plane of the lens 22 to the information recording medium 13. Assuming that the index of refraction of the semispheric lens 21 is n and the numeric aperture of the grating lens 9 is NA, the effective numeric aperture from the grating lens 9 to the focused spot 12 is n×NA. As mentioned above with respect to the first embodiment, if the index of refraction of the semispheric lens 21 is selected to have n=1.7 or some, the effective numeric aperture may be 1 or more. This makes it possible to form a quite minute focused spot 12. In place of the semispheric lens 21, the index-distributed type lens formed by the ion exchange process or the like may be used. Further, a coil 22 is located around the element 102 and the member 20 so that the coil 22 may drive a combination of the element 102 and the member 20 in the tracking direction. In addition, the coil 22 is not an essential component to this embodiment. In place, the integrated combination of the element 10 and the member 20 is mounted in a mechanism such as a swing arm so that the combination may be driven in the tracking direction.

In FIG. 11B, in place of the semispheric lens 21, a super spherical lens 23 with a part of a sphere cut out is used. This super spherical lens 23 is mounted in the member 20. In this case, assuming that the index of refraction of the super spherical lens 23 is n and the numeric aperture of the grating lens 9 is NA, the effective numeric aperture from the grating lens 9 to the focused spot 12 is $n^2$×NA. Hence, if the index of refraction of the super spherical lens 23 is selected to have a value of n=1.7 or some, the effective numeric aperture of the super spherical lens 23 is made larger than that of the semispheric lens 21. This makes it possible to form a far more minute focused spot 12 than that shown in FIG. 11A. Also in this embodiment, the index-distributed type lens produced by the ion exchange lens or the like may be used in place of the super spherical lens 23.

Sixth Embodiment

Figure 12A:
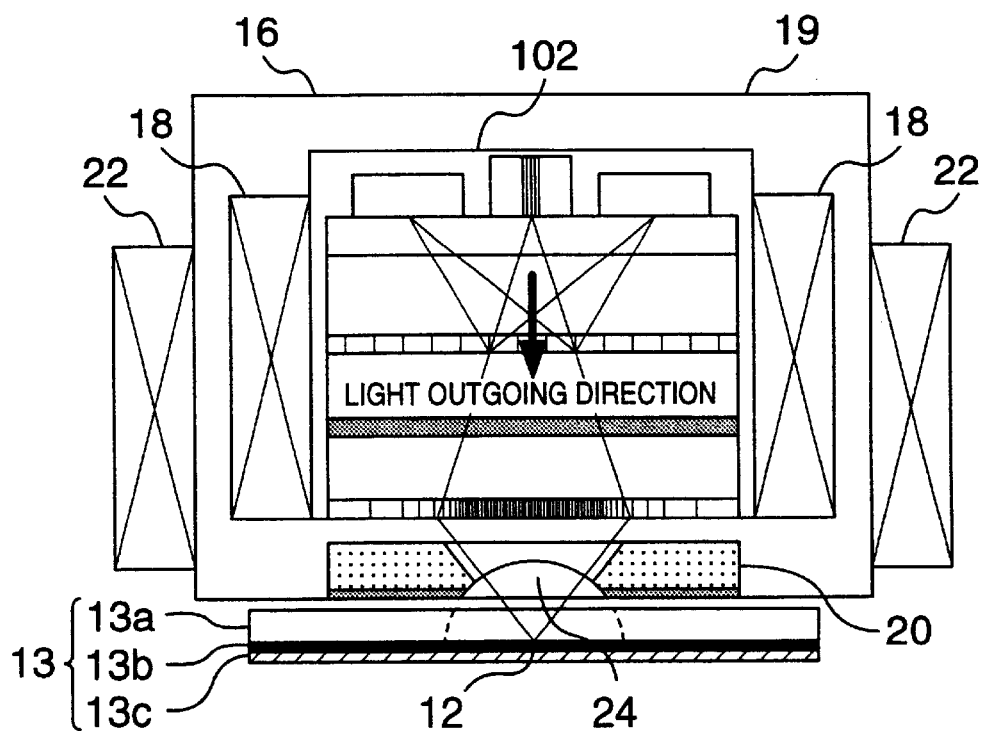
FIGS. 12A and 12B are sectional views showing a composition of an optical head according to a sixth embodiment of the present invention.
Figure 12B:
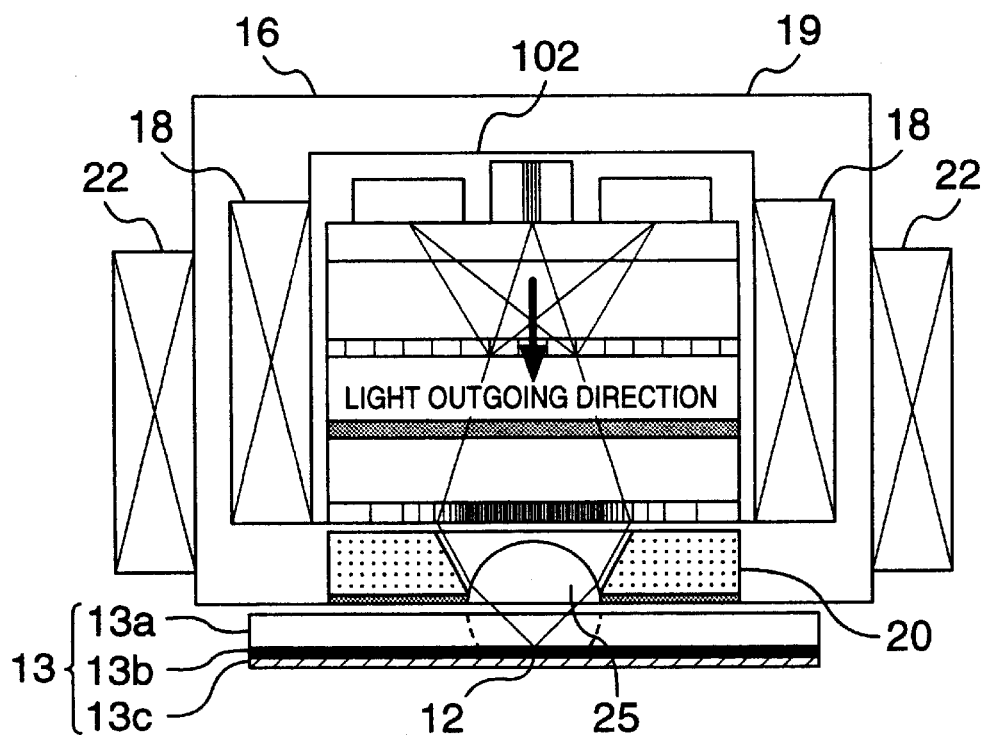

FIGS. 12A and 12B are sectional views showing a composition of an optical head according to a sixth embodiment of the present invention. The foregoing fifth embodiment is arranged so that the focused spot 12 is focused on the opposed side of an information recording film 13b to the substrate 13a, the film 13b being included in the information recording medium 13 as shown in FIGS. 12A and 12B. In the present sixth embodiment, the beam exited from the grating lens 9 is passed through the substrate 13a and then is focused on the information recording film 13b. In FIG. 12A, as shown in a dotted line of FIG. 12A, the lens 24 mounted on the member 20 is worked to be a semispheric lens if the lens 24 is considered to be combined with the substrate 13a of the information recording medium 13. This embodiment is equivalent to provision of an air layer of a thickness d in a light flux narrowing path contained in the semispheric lens 21 shown in FIG. 11A. This air layer causes a little spheric aberration to be generated on the focused spot 12. If the thickness of the air layer is grasped, the grating lens 9 may be designed so that the spheric aberration may be corrected. In FIG. 12B, the lens 25 mounted on the member 20 is worked to be the super spherical lens shown in FIG. 11B if the lens 25 is considered to be combined with the substrate 13a of the information recording medium 13 as shown in a dotted line of FIG. 12B. In either case of FIGS. 12A and 12B, the distance d between the lens 24 or 25 and the substrate 13a needs to be far smaller than a wavelength of the semiconductor laser beam source 1. (For example, the distance may be ⅛ to ¹/₁₀ of the wavelength.) This distance serves to avoid an impairment of the information recording film 13b caused by contacting the optical head with the information recording medium 13 as a result of disturbances such as external vibrations.

Seventh Embodiment

Figure 13:
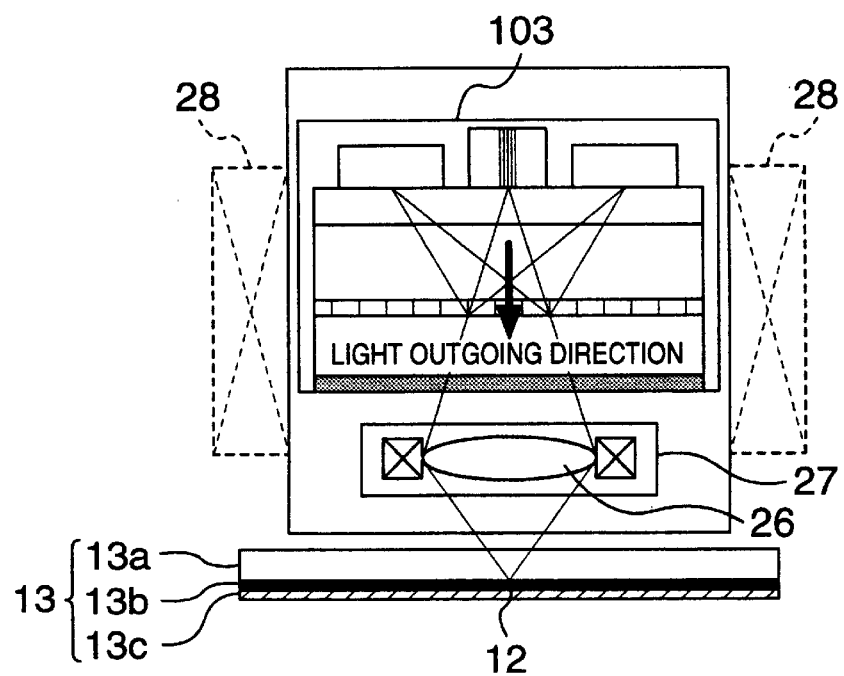
FIG. 13 is a sectional view showing a composition of an optical head according to a seventh embodiment of the present invention.

FIG. 13 is a sectional view showing a composition of an optical head according to a seventh embodiment of the present invention. The seventh embodiment illustrates the element 103 having a lamination up to the second transparent layer 6 with the phase difference generating element 7 formed therein included in the optical head 100 or 101 of the first or the second embodiment. An actuator 27 having an objective lens 26 separately from the element 103 is located so that the objective lens 26 may be driven in the focusing direction and the tracking direction. As shown in a dotted line of FIG. 13, the coil 28 is located around the element 103 and the actuator 27, so that the coil 28 may drive an integrated combination of the element 103 and the actuator 26 in the tracking direction. If the composition like this embodiment is adopted, it is possible to use a commercially available component such as a glass aspheric lens of the prior art for the objective lens 26, thereby enhancing the degree of freedom in designing an optical system. By selecting a suitable objective lens 26, as keeping a sufficient distance (for example, about 0.5 mm to 1 mm) between the objective lens 26 and the information recording medium 13, the focused spot 12 may be formed across the substrate 13a of the information recording medium 13. This makes it possible to greatly reduce the overall optical head and keep compatibility with the optical head used in a common apparatus for recording and reproducing information on and from an optical medium such as CD, CD-ROM, DVD-ROM or DVD-RAM.

Eighth Embodiment

Figure 14:
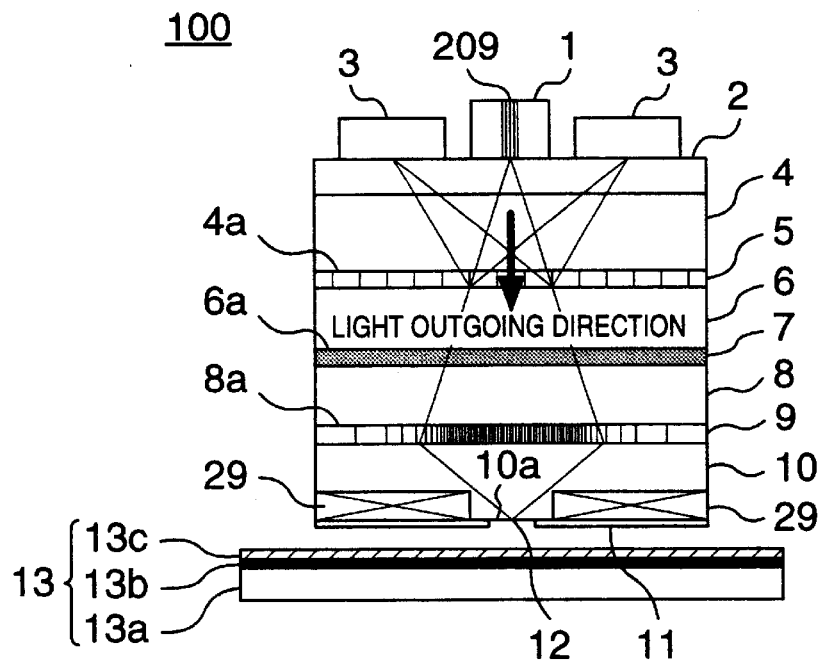
FIG. 14 is a sectional view showing a composition of an optical head according to an eighth embodiment of the present invention.

FIG. 14 is a sectional view showing a composition of an optical head according to an eighth embodiment of the present invention. This embodiment concerns with the application of the optical head to the case that the so-called magneto-optical recording medium is used as the information recording film 13b of the information recording medium 13. The optical head of this embodiment is composed so that a filmy coil 29 is formed on a fourth transparent layer 10 opposed to the information recording medium 13 in the optical head 100 or 101 of the first or the second embodiment and serves to apply a magnetic field whose intensity is modulated or whose polarization is inverted according to the information to be vertically recorded on the surface of the information recording medium 13. In recording the information, the semiconductor laser beam source 1 radiates a high output power. In place, it may radiate a continuous beam or a pulsed beam at a constant intensity. In either case, the so-called magnetic field modulation recording are carried out against the magneto-optical information recording film 13b. In general, the magnetic field modulation recording method enables to form a more minute recording mark than the so-called light intensity modulation recording method.

In reproducing a magneto-optical signal, in general, a polarized beam is focused on the magnetooptical information recording film so that the rotation (Kerr rotation) of the polarization direction in the reflected light may be detected. However, as described in pages 35 to 36 of the Proceedings of "Optical Memory Symposium '88", by using the circular dichroism of the magneto-optical recording film, a magneto-optical signal may be detected in the case of the application of a circular polarized beam. The optical dichroism of the magneto-optical recording film is made more effective as the Kerr ellipticity of the film is made larger. As described in the Paper 31pB-5 of the 15th Annual Conference on Magnetics in Japan (technical digest, page 310), the Kerr ellipticity of the magneto-optical recording film is made larger as the beam to be applied has a shorter wavelength. Hence, as described in the report number (MR91-74), 1991 in the IEICE Technical Report of the Electronics, Information and Communication Engineers of Japan, as the the source wavelength is made shorter, it is more advantageous to reproduce the magneto-optical signal by using the effect of the optical dichroism.

According to the eighth embodiment shown in FIG. 14, the circular polarized beam is focused onto the information recording medium 13b. The use of the GaN system material for forming the semiconductor laser beam source 1 makes the wavelength of the beam source about 400 to 450 nm. For example, the use of the TbFeCo system or GdTeFeCo system noncrystalline thin film or PtCo system super lattice structure high-reflection film makes it possible to form the information recording film 13b in which the system of reproducing a magneto-optical signal through the use of the optical dichroism effect in the wavelength area is effective. Further, according to this embodiment, the same optical head may detect and reproduce a concavo-convex recording mark formed on the information recording medium, a recording mark caused by the change of reflectivity (the so-called phase change recording), and the recording mark (magneto-optical recording) caused by the direction of magnetization.

In the foregoing first to the seventh embodiments, the use of the magneto-optical recording film described in the eighth embodiment and the location of the coil 29 for applying a magnetic field around the focused spot 12 makes it possible to offer the same effect as the eighth embodiment.

Ninth Embodiment

Figure 15:
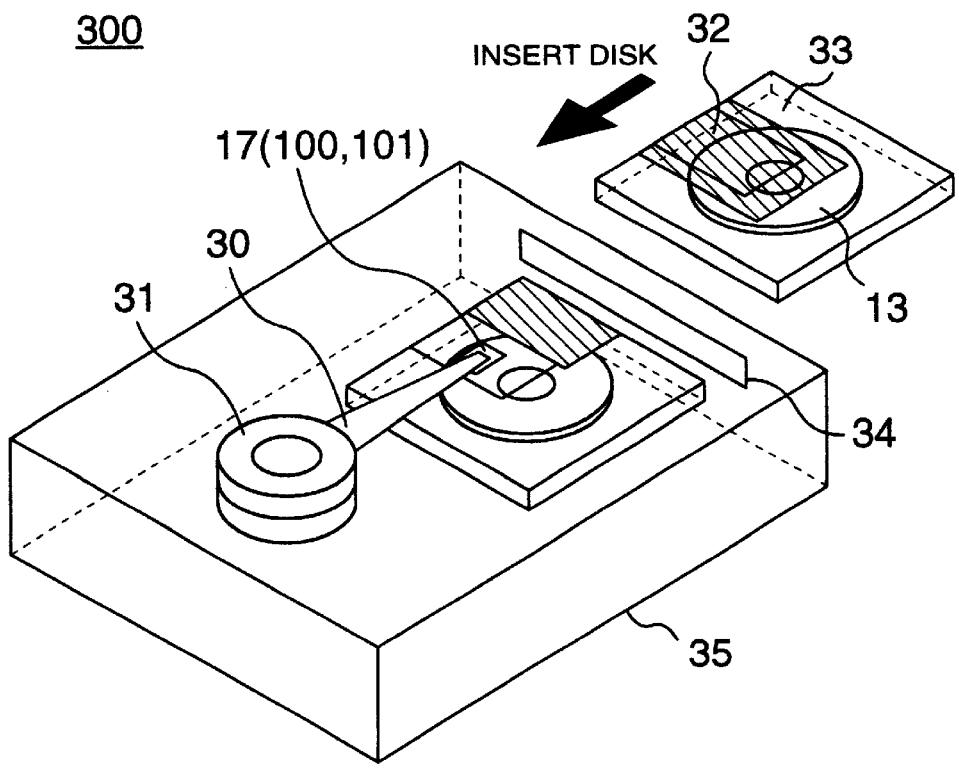
FIG. 15 is a perspective view showing an apparatus for recording and reproducing optical information according to a ninth embodiment of the present invention.

FIG. 15 is a perspective view showing an apparatus for recording and reproducing optical information according to a ninth embodiment of the present invention. In this apparatus 300, the flying slider 17 on which the optical head 100 or 101 of the fourth embodiment (see FIG. 10) is mounted is supported by a supporting arm 30 and is moved in the radial direction of the information recording medium 13 (disk-like medium in this embodiment) by means of an actuator 31. The optical disk corresponding to the information recording medium 13 is inserted into a cartridge 33 having an openable shutter 32 and a dust-proof capability.

The cartridge 33 is inserted through an opening 34 of the apparatus 300. The apparatus 300 is overall covered by a dust protective case 35.

In this embodiment, the actuator 31 employs a swing-arm type. The structure of the actuator 31 is not limited to it. In FIG. 15, a circuit for processing various signals, a spindle motor for rotating the optical disk and various I/O terminals are not illustrated. In actual, however, it goes without saying that they are essential components. According to this embodiment, the reduction of the optical head leads to reduction of the overall apparatus 300 in size and thickness and implementation of the high-performance apparatus 300 having a fast access capability.

Tenth Embodiment

Figure 16:
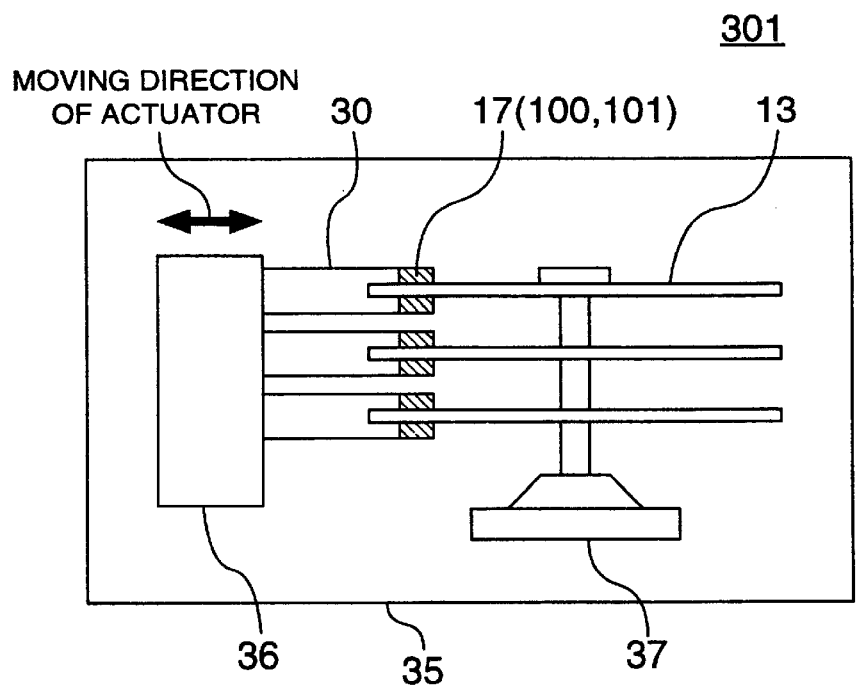
FIG. 16 is a side view showing an apparatus for recording and reproducing optical information according to a tenth embodiment of the present invention.

FIG. 16 is a side view showing an apparatus 301 for recording and reproducing optical information. This apparatus 301 is the so-called stacked structure information recording and reproducing apparatus. Like the ninth embodiment, the flying slider on which the optical head 100 or 101 is mounted is supported by a supporting arm 30. The flying slider 17 is moved in the radial direction of the laminated optical disks. The optical disk 13 is fixed to a spindle motor 37 and the apparatus 301 is overall covered by a dust protective case 35. The present embodiment makes it possible to realize a small-sized but a very large volume information recording apparatus.

Eleventh Embodiment

Figure 17:
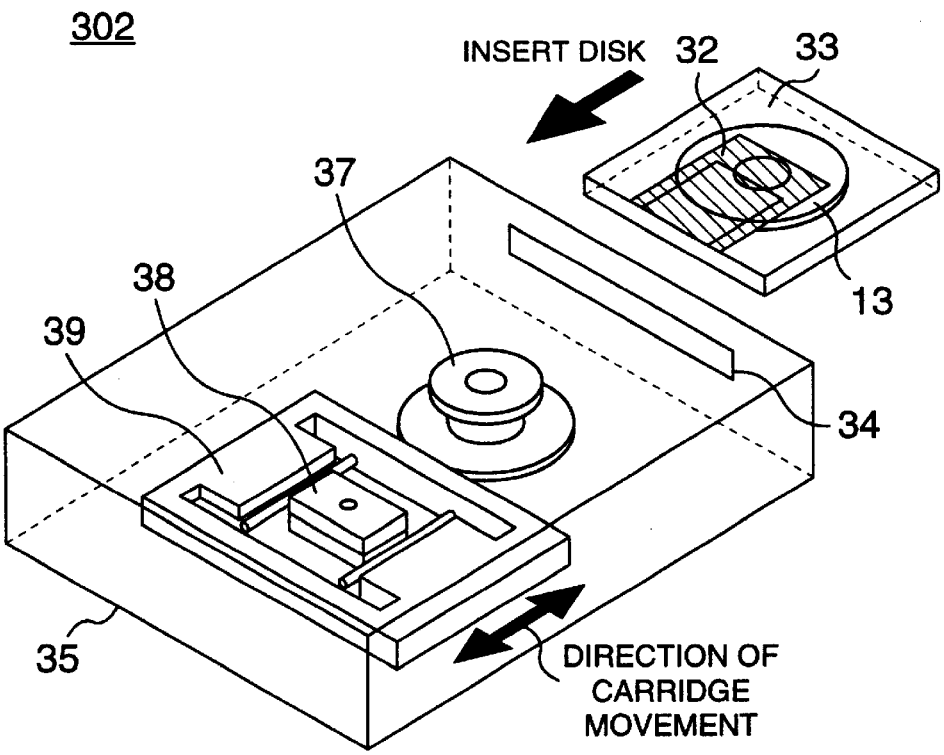
FIG. 17 is a perspective view showing an apparatus for recording and reproducing optical information according to an eleventh embodiment of the present invention.

FIG. 17 is a perspective view showing an apparatus 302 for recording and reproducing optical information according to an eleventh embodiment of the present invention. This apparatus 302 is constructed so that the optical head 102 or 103 of the fifth embodiment (see FIG. 11) or the seventh embodiment (see FIG. 13) is mounted in a carriage 38 and then the carriage 38 is moved in the radial direction of the optical disk 13 by means of a carriage moving mechanism 39. Like the ninth embodiment, the optical disk is inserted into a cartridge 33 having an openable shutter 32 and a dust-proof capability. Then, the cartridge 33 is inserted through an opening 34 of the apparatus 32 and is rotated by a spindle motor 37. The overall apparatus 32 is covered by the dust protective case 35. The apparatus 302 of this embodiment may receive a medium composed to form a focused spot over the substrate or without passing the substrate as the information recording medium.

As set forth above, according to the present invention, like the semiconductor laser having a Fabri-Perot horizontal resonator, the semiconductor laser used as a light source is structured to fire a flux of light from an end of an active layer. Hence, this semiconductor laser is more advantageous in light of enhancing an output power or controlling the polarization direction of the light than the so-called surface emitting laser. Further, the present invention may realize the optical head to be applied to the apparatus for recording and reproducing recordable optical information. Moreover, not only the light source and the photo detector elements but also the other function elements may be integrally formed by the semiconductor manufacturing process technique such as a photomask exposure process, thereby realizing the small and inexpensive optical head.

What is claimed is:

1. An optical head comprising:
    a light beam source;
    a light beam focusing element for focusing and applying a light beam radiated from said light beam source onto an information recording medium;
    a phase difference generating element for generating a predetermined phase difference to a light beam from said light beam source and the light beam reflected on said information recording medium;
    a light beam separating element for separating the light beam reflected on said information recording medium into fluxes of light;
    one or more photo detector elements for detecting an information signal recorded on said information recording medium in response to said reflected light; and
    wherein said light beam source is integrated on the same substrate as said photo detector element and said light beam source is a semiconductor laser having a vertical resonator formed against a light waveguide structure having an active layer on the side of semiconductor crystal vertically formed on said substrate.

2. The optical head as claimed in claim 1, wherein said photo detector element is integrated on the same side of said substrate as said light beam source.

3. The optical head as claimed in claim 2, wherein the light beam radiated from said light beam source is passed through said substrate and then is applied and focused onto said information recording medium.

4. The optical head as claimed in claim 1, wherein said photo detector element is integrated on the opposed side of said substrate to said light source.

5. The optical head as claimed in claim 4, wherein the light beam radiated from said light beam source is passed through said substrate and then is applied and focused onto said information recording medium.

6. The optical head as claimed in claim 1, wherein said light beam separating element and said phase difference generating element and said focusing element are integrated on the opposed surface of said substrate to said light source.

7. The optical head as claimed in claim 6, wherein said light beam separating element is a diffraction grating.

8. The optical head as claimed in claim 6, wherein the phase difference generated by said phase difference generating element is a quarter of a wavelength and an optical axis of said phase difference generating element is set about 45 degrees with respect to an active layer of said semiconductor laser.

9. The optical head as claimed in claim 6, wherein said focusing element is a grating lens, a index-distributed type lens, or a convex lens.

10. The optical head as claimed in claim 6, wherein said focusing element is a grating lens, the optical path from said grating lens to a focused spot of a light beam is made of a solid material, said focused spot of the light beam is formed near the surface of said solid material located close to and as opposed to said information recording medium, and the effective numeric aperture given by said grating lens is one or more.

11. The optical head as claimed in claim 6, wherein said light focusing element is composed of a grating lens and a semispheric lens, said semispheric lens is located to be convex on the side of said light source, and a synthesized numeric aperture of said grating lens and said semispheric lens is one or more.

12. The optical head as claimed in claim 1, wherein said substrate is a sapphire (a-$Al_2O_3$) substrate or silicon carbide (a-SiC) substrate.

13. The optical head as claimed in claim 1, wherein a slide-resisting protective film having a slide-resisting function is formed on the opposed side of said light focusing element to said information recording medium, excepting the portion where a light beam is focused.

14. The optical head as claimed in claim 13, wherein said slide-resisting protective film is made of ceramics.

15. The optical head as claimed in claim 13, wherein a filmy electromagnetic coil is formed on said slide-resisting protective film.

16. The optical head as claimed in claim 1, wherein said optical head is mounted on a flying slider.

17. The optical head as claimed in claim 16, wherein the flying amount is 1 μm or less.

18. The optical head as claimed in claim 1, wherein said light beam separating element and said phase difference generating element are integrated at a given interval and on the opposed side of said substrate to said light source and the integrated matter is located separately from said focusing element.

19. The optical head as claimed in claim 18, wherein said light focusing element is a grating lens, a index-distributed type lens, or a convex lens.

20. The optical head as claimed in claim 1, wherein said light beam separating element, said phase difference generating element and said focusing element are located on the opposed side of said substrate to said light source and separately from said substrate.

21. The optical head as claimed in claim 20, wherein said focusing element is a grating lens, a index-distributed type lens, or a convex lens.

22. An apparatus for recording and reproducing optical information comprising:

an optical head having a light beam source, a light beam focusing element for focusing and applying a light beam radiated from said light source onto an information recording medium, a phase difference generating element for generating a predetermined phase difference to a ray of light from said beam source and the light reflected on said information recording medium, a light beam separating element for separating the light beam reflected on said information recording medium into light beams, one or more photo detector elements for detecting an information signal recorded on said information recording medium in response to said reflected light, said light beam source being integrated on the same substrate as said photo detector element and said light beam source being a semiconductor laser having a vertical resonator formed against a light waveguide structure having an active layer on the side of semiconductor crystal vertically formed on said substrate;

a mechanism for supporting said optical head;

a disk-like information recording medium;

a mechanism for rotating and supporting said information recording medium; and a dust-proof case for accommodating said supporting mechanism, said information recording medium, and said rotating mechanism.

23. The apparatus as claimed in claim 22, wherein said optical head is located on the opposed side of an information recording film formed on said information recording medium to a substrate of said information recording medium and a light beam radiated from said light beam source is applied and focused onto said information recording film without passing through the substrate of said information recording medium.

24. The apparatus as claimed in claim 22, wherein said optical head is arranged so that said light beam separating element and said phase difference generating element are integrated at a given interval and on the opposed side of said optical head to said light beam source with respect to said substrate and the integrated matter is located separately from said focusing element.

25. The apparatus as claimed in claim 22, wherein said optical head is arranged so that said light beam separating element and said phase difference generating element and said focusing element are located on the opposed side of said substrate to said light beam source and separately from said substrate.

* * * * *